Patented Nov. 22, 1949

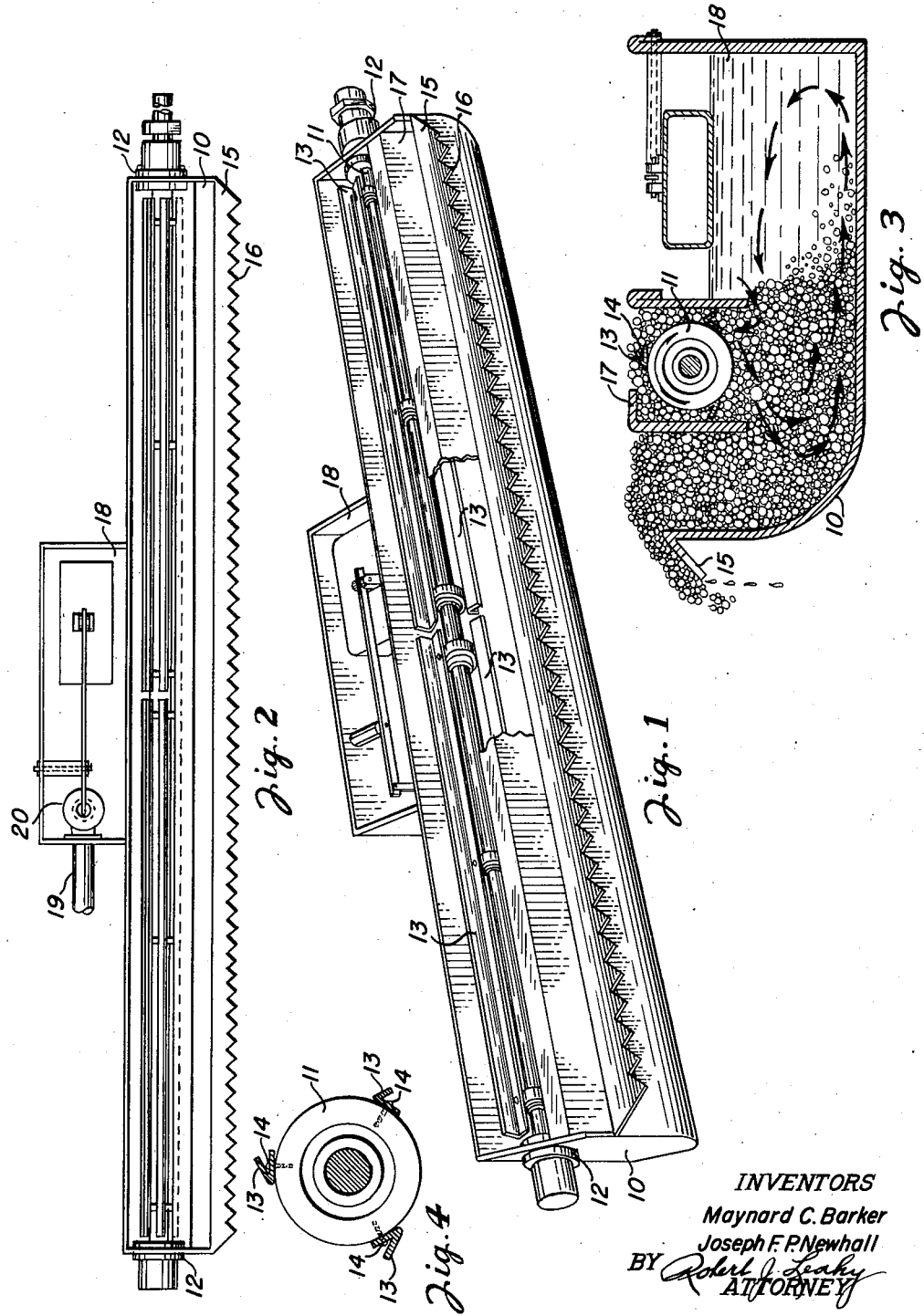

2,488,876

UNITED STATES PATENT OFFICE 2,488,876

MECHANICAL FOAMER

Joseph F. P. Newhall, St. Petersburg, and Maynard C. Barker, Avon Park, Fla., assignors to S. C. Johnson & Son, Inc., Racine, Wis.

Application February 5, 1947, Serial No. 726,538

9 Claims. (Cl. 259—9)

This invention relates to a foaming apparatus. More particularly, it relates to an improved mechanical foaming apparatus, especially adapted for providing a wax protective coating for fruits and vegetables.

Until recently wax coatings in the form of an aqueous wax emulsion were applied to fruit and vegetables by either the dip method, or the spray method. Both of these methods are being supplanted by a recent development wherein an aqueous wax emulsion is applied to the fruit and vegetables in the form of a foam.

In the original installation of the wax foamer, the wax was foamed by aeration. Compressed air was blown into a tank containing aqueous wax emulsion and as the bubbles or foam formed, they overflowed the tank and dropped onto fruit or vegetables which were passing below the tank.

While in principle this method of applying wax to fruit and vegetables is excellent, this method of generating foam was unreliable, the direction of flow of the foam was hard to control, and the concentration of the foam varied.

It is therefore the principal object of our invention to provide a foaming apparatus especially adapted for use with the foaming method of wax coating fruit and vegetables, which will produce a uniform foam, the concentration and direction of which can be easily controlled.

Another object of our invention is to produce a foaming apparatus which will be economical to construct, and which can easily be attached to machines wherein a source of foam is desired.

It is a further object of our invention to provide an apparatus for producing a uniform foam in a continuous manner.

These and other objects and advantages will appear more fully in connection with the accompanying drawing and description.

Therefore, in accordance with our invention, there is provided a foaming apparatus comprising an agitator tank, agitating means rotatably mounted therein, a discharge lip, and a baffle positioned between the discharge lip and the agitating means. The agitating means preferably comprises an agitator spool which has a plurality of agitator blades affixed thereto. In addition, a surge tank is positioned at the rear of the agitator tank, and contains a float-controlled check valve to regulate the level of the coating composition to be foamed.

The apparatus of this invention is best described by reference to the accompanying drawing, wherein:

Fig. 1 is a perspective view of our improved foaming apparatus with part broken away to show the agitator blades.

Fig. 2 is a top plan view of the improved foaming machine of Fig. 1.

Fig. 3 is a schematic view showing the direction of movement of the foam.

Fig. 4 is an enlarged end view of the agitator spool showing the agitator blades.

Similar numerals refer to similar parts throughout the several views.

Referring especially to Fig. 1, it will be seen that our machine is made up of an agitator tank 10 in which is positioned an agitator spool 11. The agitator spool 11 is affixed to the agitator tank 10 in rotatable position by means of mounting brackets 12. The agitator spool 11 may be a solid steel rod, or if preferred of other material. Upon the agitator spool 11 is mounted a plurality of agitator blades 13. As shown in Figs. 3 and 4, the agitator blades 13 are preferably constructed of angle iron and bent into a V-shape. One side of the V-shaped blade 13 is secured to the agitator spool 11 by means of screws 14. If desired, however, other means of securing the agitator blades 13 to the agitator spool 11 may be used, such as bolting, riveting, welding and the like. The V-shaped agitator blades 13 are so positioned on the beater spool 11 so that the open V's of the blades enter the fluid as the spool 11 is being rotated.

The front of the agitator tank 10 is bent downwardly to form a discharge lip 15 with a serrated edge 16. Between the agitator spool 11 and the discharge lip 15 is positioned a baffle 17 to aid in controlling the direction of the foam.

At the rear of the agitator tank 10 is positioned a surge tank 18 having a fluid inlet 19 and a float-controlled check valve 20. The level of fluid in the surge tank 18 is maintained by means of the check valve 20. The bottom of the surge tank 18 is in communication with the tank 10 to allow free flow of fluid from the surge tank to the agitator tank 10.

The agitator spool 11 is rotated by means of a motor (not shown). If desired, the agitator tank may be provided with a drain (not shown).

While it will be obvious that this machine will have various applications wherever a uniform foam is desired, it is especially adapted for use in wax coating fruit and vegetables such as potatoes, cucumbers, tomatoes, oranges, grapefruit, tangerines, lemons and the like.

The machine is easily mounted over a conveyor carrying fruit or vegetables and a protective coating of wax may be applied in the form of wax containing foam, as the fruit and vegetables proceed under the discharge lip 15 of the agitator tank 11.

Describing the operation of the machine in more detail as it applies to wax coating fruit and vegetables, an aqueous wax emulsion is flowed into a surge tank 18 until the wax level in the agitator tank is brought up to the desired level by opening the check valve 20 of the surge tank 18. The agitator spool 11 carrying the agitator blades 13 is then caused to rotate at the desired speed, thus causing the open V's of the blades 13 to enter the wax emulsion causing air (bubbles) to enter the wax. Thence, by the circulation induced mechanically by the rotating agitator blades 13, the bubbles are directed against the baffle 17, deflected downward so as to pass between the lower extremity of the baffle 17 and the bottom of the agitator tank 10 and are delivered to the far side of the baffle 17 and by the continuous cycle forced up and over the discharge lip 15 of the tank 10 to fall at will upon the fruit or vegetables passing below. The discharge lip 15 is preferably lower than the sides of the tank 10 to insure direction of the foam. The discharge lip is also preferably serrated at 16 to facilitate the flow of material and any foam that breaks down into wax will drip from the several points instead of running to the side of the tank 10.

The position of the discharge lip and the baffle are essential in controlling the direction of the foam. Preferably the top of the baffle as well as the sides of the tank will be higher than the top of the discharge lip, so as to cause the foam to flow over the discharge lip.

The size of the foam can be controlled by the speed of the agitator spool 11 in conjunction with adjusting the wax level. While the size of the foam may be varied over a wide range, the particular apparatus shown in the drawing will produce a foam of one inch bubbles to foam of one-sixteenth inch bubbles by adjusting both the wax level and varying the speed of the beater spool 11.

Many apparently widely different embodiments of this invention may be made without departing from the principle, breadth and spirit thereof, and it is to be understood, therefore, that this invention is not limited to the specific embodiments thereof except as encompassed by the following claims.

We claim:

1. A foaming apparatus comprising an agitator tank, agitating means rotatably and horizontally mounted therein a discharge lip, and a baffle positioned in said agitator tank between said discharge lip and the agitating means, said baffle forming a barrier to deflect and cause the foam to pass between its lower extremity and the bottom of said agitator tank.

2. A foaming apparatus comprising an agitator tank, an agitator spool rotatably and horizontally mounted therein, a plurality of agitator blades affixed to said agitator spool, a discharge lip, and a baffle positioned in said agitator tank between said discharge lip and the agitator spool, said baffle forming a barrier to deflect and cause the foam to pass between its lower extremity and the bottom of said agitator tank.

3. A foaming apparatus comprising an agitator tank, the front of which is bent downwardly to form a discharge lip, an agitator spool rotatably and horizontally mounted within said agitator tank, a plurality of agitator blades affixed to said agitator spool, and a baffle positioned in said agitator tank between said discharge lip and the agitator spool, said baffle forming a barrier to deflect and cause the foam to pass between its lower extremity and the bottom of said agitator tank.

4. A foaming apparatus comprising an agitator tank, an agitator spool rotatably and horizontally mounted therein, a plurality of agitator blades affixed to said agitator spool, a discharge lip having a serrated edge, and a baffle positioned in said agitator tank between said discharge lip and the agitator spool, said baffle forming a barrier to deflect and cause the foam to pass between its lower extremity and the bottom of said agitator tank.

5. A foaming apparatus comprising an agitator tank, an agitator spool rotatably and horizontally mounted therein, a plurality of agitator blades affixed to said agitator spool, said agitator blades being V-shaped, a discharge lip, and a baffle positioned in said agitator tank between said discharge lip and the agitator spool, said baffle forming a barrier to deflect and cause the foam to pass between its lower extremity and the bottom of said agitator tank.

6. A foaming machine comprising an agitator tank, an agitator spool rotatably and horizontally mounted therein, a plurality of agitator blades affixed to said agitator spool, a discharge lip, a baffle positioned in said agitator tank between said discharge lip and the agitator spool, and a surge tank positioned at the rear of said agitator tank, said baffle forming a barrier to deflect and cause the foam to pass between its lower extremity and the bottom of said agitator tank.

7. A foaming machine comprising an agitator tank, an agitator spool rotatably and horizontally mounted therein, a plurality of agitator blades affixed to said agitator spool, a discharge lip, a baffle positioned in said agitator tank between said discharge lip and the agitator spool, and a surge tank positioned at the rear of said agitator tank, said surge tank containing a float-controlled check valve, said baffle forming a barrier to deflect and cause the foam to pass between its lower extremity and the bottom of said agitator tank.

8. A foaming machine comprising an agitator tank, the front of which is bent downwardly to form a discharge lip, said discharge lip having a serrated edge, an agitator spool rotatably and horizontally mounted within said agitator tank, a plurality of agitator blades affixed to said agitator spool, said agitator blades being V-shaped, a baffle positioned in said agitator tank between said discharge lip and the agitator spool, a surge tank positioned at the rear of said agitator tank, said surge tank containing a float-controlled check valve, said baffle forming a barrier to deflect and cause the foam to pass between its lower extremity and the bottom of said agitator tank.

9. In a fruit and vegetable coating machine, the improved combination which includes a foaming apparatus comprising an agitator tank, agitating means rotatably and horizontally mounted therein, a discharge lip and a baffle positioned in said agitator tank between said discharge lip and the agitating means, said baffle forming a barrier to deflect and cause the foam to pass between its lower extremity and the bottom of said agitator tank.

JOSEPH F. P. NEWHALL.
MAYNARD C. BARKER.

REFERENCES CITED

The following references are of record in the file of this patent:

UNITED STATES PATENTS

| Number | Name | Date |
|---|---|---|
| 1,085,992 | Nilsson | Feb. 3, 1914 |
| 1,274,180 | Mauch | July 30, 1918 |
| 1,283,159 | Groch | Oct. 29, 1918 |
| 1,737,624 | Thomson | Dec. 3, 1929 |
| 1,797,147 | Imhoff et al. | Mar. 17, 1931 |
| 2,114,275 | Murphy et al. | Apr. 12, 1938 |